United States Patent
Morita

(10) Patent No.: US 7,979,276 B2
(45) Date of Patent: Jul. 12, 2011

(54) SPEECH RECOGNITION APPARATUS AND SPEECH RECOGNITION METHOD

(75) Inventor: Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 846 days.

(21) Appl. No.: 11/814,794

(22) PCT Filed: Dec. 19, 2005

(86) PCT No.: PCT/JP2005/023295
§ 371 (c)(1),
(2), (4) Date: Jul. 25, 2007

(87) PCT Pub. No.: WO2006/080161
PCT Pub. Date: Aug. 3, 2006

(65) Prior Publication Data
US 2009/0018831 A1 Jan. 15, 2009

(30) Foreign Application Priority Data
Jan. 28, 2005 (JP) ................. 2005-020813

(51) Int. Cl.
*G10L 15/00* (2006.01)
(52) U.S. Cl. .......... 704/235; 704/275; 382/203
(58) Field of Classification Search .......... 704/235, 704/275; 382/203
See application file for complete search history.

(56) References Cited

U.S. PATENT DOCUMENTS

| | | | | |
|---|---|---|---|---|
| 4,961,177 A * | 10/1990 | Uehara | ........ | 704/272 |
| 5,878,274 A | 3/1999 | Kono et al. | ........ | 395/828 |
| 6,219,640 B1 * | 4/2001 | Basu et al. | ........ | 704/246 |
| 6,219,645 B1 * | 4/2001 | Byers | ........ | 704/275 |
| 2003/0018425 A1 * | 1/2003 | Gronau et al. | ........ | 701/71 |
| 2003/0018475 A1 * | 1/2003 | Basu et al. | ........ | 704/270 |
| 2003/0097190 A1 * | 5/2003 | Watanabe et al. | ........ | 700/17 |
| 2004/0267521 A1 * | 12/2004 | Cutler et al. | ........ | 704/202 |
| 2008/0059174 A1 * | 3/2008 | Hershey et al. | ........ | 704/240 |
| 2008/0309761 A1 * | 12/2008 | Kienzle et al. | ........ | 348/143 |

FOREIGN PATENT DOCUMENTS

| | | |
|---|---|---|
| EP | 1 345 210 A2 | 9/2003 |
| JP | 03-129400 | 6/1991 |
| JP | 05-188993 | 7/1993 |
| JP | 06-311220 | 11/1994 |

(Continued)

OTHER PUBLICATIONS

Hyun-Hwa Oh et al. "Robust Endpoint Detection for Bimodal System in Noisy Environments" School of Electronic and Electrial Engineering, Kyungpook National University, pp. 49-57, Sep. 2003 (with English abstract).

(Continued)

*Primary Examiner* — Daniel D Abebe
(74) *Attorney, Agent, or Firm* — DLA Piper LLP (US)

(57) ABSTRACT

Voices are prevented from being recognized with poor accuracy when a speaker is not close to a sound pickup device. A speech recognition apparatus (10) includes a sound pickup device (16) picking up sounds, a photographing device (18) photographing images of a speaker making voices into the sound pickup device (16), a voice recognition function unit (132) recognizing voices on the basis of the picked-up voices, and a recognition/learning determination unit (142) restricting the voice recognition function unit (132) from recognizing voices when the photographed images do not contain speaker images showing at least part of the speaker.

5 Claims, 3 Drawing Sheets

10 : SPEECH RECOGNITION APPARATUS

FOREIGN PATENT DOCUMENTS

| | | |
|---|---|---|
| JP | 11-085190 | 3/1999 |
| JP | 11085190 A | 3/1999 |
| JP | 2002-169586 | 6/2002 |
| JP | 2003-029777 | 1/2003 |
| JP | 2003-295892 | 10/2003 |
| JP | 2004-240154 | 8/2004 |
| JP | 2004-246095 | 9/2004 |

OTHER PUBLICATIONS

Japanese language office action dated Jan. 3, 2011 and its partial English language translation for corresponding Japanese application 2005020813 lists the reference above.

Chinese language office action and its English language translation for corresponding Chinese application 200580047250.

\* cited by examiner

10 : SPEECH RECOGNITION APPARATUS

SPEECH RECOGNITION APPARATUS AND SPEECH RECOGNITION METHOD

TECHNICAL FIELD

The present invention relates to a speech recognition apparatus and a speech recognition method.

BACKGROUND ART

Voice recognition technology for converting voices into character strings is known. With this voice recognition technology, voices made by a speaker are first picked up by a sound pickup device. Next, a characteristic pattern of the picked up voices is extracted. A character string pattern corresponding to the extracted characteristic pattern is outputted as a recognition result, whereby the voices are converted to character strings.

Patent Document 1 relates to the combined use of such voice recognition technology with lip recognition technology that recognizes patterns on the basis of characteristic patterns in the shape of the speaker's lips.

[Patent Document 1] Japanese Patent Application Laid-Open Publication No. 6-311220

DISCLOSURE OF THE INVENTION

Problems the Invention is Intended to Solve

However, with the conventional voice recognition technology described above, problems are encountered in that when the speaker is not close to the sound pickup device, the characteristic pattern of the voices made by the speaker cannot be accurately extracted, and voice recognition is less precise.

The present invention was devised in order to resolve these problems, and an object thereof is to provide a speech recognition apparatus and a speech recognition method whereby it is possible to prevent voice recognition from being imprecise when the speaker is not close to the sound pickup device.

Means for Solving the Problem

The speech recognition apparatus according to the present invention for resolving these problems includes a sound pickup device picking up sound, a photographing device photographing images of a speaker making voices into the sound pickup device, a voice recognition unit recognizing voices on the basis of the picked-up voices, and a voice recognition restriction unit restricting the voice recognition unit from recognizing voices when the photographed images do not contain speaker images showing at least part of the speaker.

When speaker images are not contained in the photographed images, it is highly possible that the speaker is not close, compared to cases in which speaker images are contained. According to the present invention, voice recognition is restricted from starting when speaker images are not contained in the captured images, and the speech recognition apparatus can therefore prevent voices from being recognized with poor accuracy when the speaker is not close to the sound pickup device.

In the speech recognition apparatus described above, the speaker images may be lip images showing the lip of the speaker.

When the speaker does not have his or her lips oriented towards the speech recognition apparatus, it is highly possible that the voices made by the speaker do not easily reach the speech recognition apparatus, compared with cases in which the lips are oriented towards the apparatus. According to the present invention, voice recognition is restricted when lip images showing the lips of the speaker are not contained in the captured images, and the speech recognition apparatus can therefore prevent voices from being recognized with poor accuracy when the voices made by the speaker do not easily reach the pattern recognition apparatus.

In the speech recognition apparatus described above, the photographing device may sequentially photograph the images, and the voice recognition restriction unit may restrict the voice recognition unit from recognizing voices when the lips shown in the sequentially captured lip images is not moving, even in cases in which the lip images are contained in the photographed images.

When the speaker's lips are not moving, it is highly possible that the speaker is not speaking. According to the present invention, voice recognition is restricted when the speaker's lips are not moving, and the speech recognition apparatus can therefore prevent voices from being recognized with poor accuracy when the speaker is not speaking.

The speech recognition apparatus described above may further comprise a voice directivity controller aligning the directivity of the voice capturing device toward the lips shown in the lip images contained in the photographed images.

According to the present invention, it is possible to ensure that voices are recognized with greater accuracy by aligning the directivity of the voice capturing device toward the speaker's lips shown in the captured lip images.

The speech recognition apparatus described above may further comprise a lip recognition unit recognizing lip shapes on the basis of the lip shapes of the speaker or transitions of the shapes shown in the lip images contained in the photographed images, and a lip recognition learning unit causing the lip recognition unit to learn to recognize lip shapes on the basis of recognition results of the voice recognition unit based on the picked-up voices, and on the basis of the lip shapes or the transitions of the shapes shown in the lip images contained in the images photographed when the speaker is making voices.

According to the present invention, the lip shapes or shape transitions produced when voices are made can be captured. Furthermore, the voices are recognized by the voice recognition unit. Therefore, the results of voice recognition can be correlated with the lip shapes or shape transitions. That is, lip recognition learning becomes possible.

The speech recognition apparatus described above may further comprise a sound pickup condition evaluation value obtaining unit obtaining a sound pickup condition evaluation value indicating the pickup condition of voices picked up by the sound pickup device, wherein the lip recognition learning unit learns based on the recognition results of the voice recognition unit when the sound pickup condition indicated by the sound pickup condition evaluation value is equal to or greater than a predetermined threshold.

According to the present invention, in the speech recognition apparatus, the lip recognition learning unit can learn only when the pickup of voices made by the speaker is satisfactory. Specifically, voice recognition learning is performed only when voices are being recognized in a satisfactory manner, and the speech recognition apparatus can therefore reduce the possibility that lip recognition will be learned based on the results of inaccurate voice recognition.

The voice recognition apparatus according to the present invention includes a sound pickup device picking up sound, a photographing device photographing lip images showing the lips of a speaker making voices into the sound pickup device, a sound pickup condition evaluation value obtaining unit obtaining a sound pickup condition evaluation value indicating the pickup condition of voices picked up by the sound pickup device, a voice recognition unit recognizing voices on the basis of the picked-up voices, a lip recognition unit recognizing lip shapes on the basis of the lip shapes of the speaker or transitions of the shapes shown in the lip images contained in the photographed images, and a determiner determining, in accordance with the sound pickup condition indicated by the sound pickup condition evaluation value, whether to recognize voices with the aid of the voice recognition unit or with the aid of the lip recognition unit.

According to the present invention, it is possible to switch between voice recognition and lip recognition in accordance with the sound pickup condition, and therefore to allow the speech recognition apparatus to prevent voices from being recognized with poor accuracy when sound pickup condition is poor.

The speech recognition method of the present invention includes a sound pickup step of picking up sounds by a sound pickup device, a photographing step of photographing images of a speaker making voices into the sound pickup device, a voice recognition step of recognizing voices on the basis of the picked-up voices, and a voice recognition restriction step of restricting voice recognition in the voice recognition step when the photographed images do not contain speaker images showing at least part of the speaker.

BEST MODE FOR CARRYING OUT THE INVENTION

Embodiments of the present invention will now be described with reference to the drawings.

Figure 1:
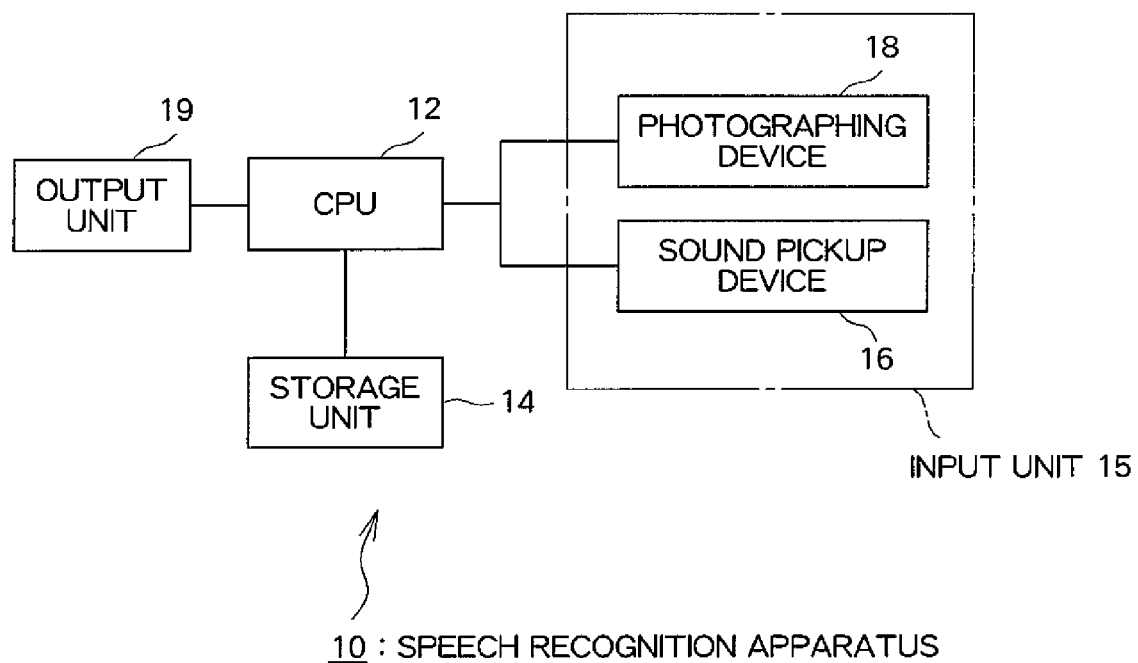
FIG. 1 is a structural diagram of the speech recognition apparatus according to an embodiment of the present invention.

A speech recognition apparatus 10 according to the present invention is a computer of a portable phone, for example, and includes a CPU 12, a storage unit 14, an input unit 15, and an output unit 19, as shown in FIG. 1.

The input unit 15 is a functional unit for inputting external information of the speech recognition apparatus 10 to the CPU 12, and includes a sound pickup device 16 and a photographing device 18 in the present embodiment. The sound pickup device 16 is, e.g., a directivity microphone or another such device that can pick up voices. The sound pickup device 16 has directivity in the direction in which sounds are picked up, and the CPU 12 is configured to be capable of controlling this directivity. Specifically, the CPU 12 is configured to be capable of controlling the directivity by controlling the position of the sound pickup device 16. The sound pickup device 16 converts the picked up sounds to electrical signals and outputs the signals to the CPU 12.

The photographing device 18 is, e.g., a camera, a video camera, or another such device that can sequentially photograph images. The photographing device 18 is configured so that the photographing direction thereof can be varied by the control of the CPU 12. Specifically, the CPU 12 can control the photographing direction of the photographing device 18 by controlling the position thereof. The photographing device 18 outputs the photographed images as bitmaps to the CPU 12.

The CPU 12 is a processing unit for running programs stored in the storage unit 14, and controls the various parts of the speech recognition apparatus 10.

The CPU 12 performs processes for recognizing voices and lip shapes. In voice recognition, the CPU 12 first uses the sound pickup device 16 to pick up voices made by a speaker. Next, the CPU extracts a characteristic pattern of the picked-up voices. More specifically, the CPU 12 determines whether or not a pattern is included that is the same as the characteristic patterns stored in the storage unit 14. As a result of this determination, only a characteristic pattern determined to contain the same pattern is extracted. A character string pattern corresponding to the extracted characteristic pattern is outputted as a recognition result, and the CPU 12 thereby converts voices into a character string.

In lip recognition, the CPU 12 first uses the photographing device 18 to photograph lip images of the speaker. Extracted next is a characteristic pattern of the lip shapes shown in the photographed lip images, or a characteristic pattern of transitions in these shapes. More specifically, the CPU 12 determines whether or not a pattern is included that is the same as the characteristic patterns stored in the storage unit 14. As a result of this determination, only a characteristic pattern determined to contain the same pattern is extracted. A character string pattern corresponding to the extracted characteristic pattern is outputted as a recognition result, and the CPU 12 thereby converts the shapes or movements of the lips into a character string.

The storage unit 14 stores a program for implementing the present embodiment. The storage unit also functions as the working memory of the CPU 12.

The storage unit 14 correlates and stores voice characteristic patterns and character string patterns for the purpose of voice recognition. Furthermore, the storage unit 14 correlates and stores characteristic patterns of lip shapes or shape transitions and character string patterns for the purpose of lip recognition. A neural network or another learning system in which a characteristic pattern is used as an input and a character string pattern is used as an output can be used for such recognition. In this embodiment, the storage unit 14 correlates and stores such characteristic patterns and character string patterns.

In the output unit 19, data inputted form the CPU 12 is outputted by an output device in accordance with instructional information inputted from the CPU 12. For example, a display or another such display device, or a speaker or another such voice output device can be used for this output device.

In the present embodiment, the speech recognition apparatus 10 as described above is designed so that voices are recognized with greater accuracy. Specifically, the speech recognition apparatus 10 prevents voices from being recognized with poor accuracy when the speaker is not close to the sound pickup device 16. The speech recognition apparatus 10 also prevents voices from being recognized with poor accuracy when the voices made by the speaker have difficulty reaching the pattern recognition device. Furthermore, the speech recognition apparatus 10 prevents voices from being recognized with poor accuracy when the speaker is not producing voices. The speech recognition apparatus 10 also ensures that voices are recognized with greater accuracy by aligning the directivity of the voice capturing device toward the lips of the speaker. The speech recognition apparatus 10 also learns lip recognition on the basis of the results of voice recognition and on the basis of the shapes of the lips that produces voices or transitions of these shapes. The speech recognition apparatus 10 reduces the possibility that learning of lip recognition will be performed based on the results of inaccurate voice recognition. Furthermore, the speech recognition apparatus 10 switches between voice recognition and lip recognition, whereby voices are prevented from being recognized with poor accuracy when sound pickup conditions are poor.

Figure 2:
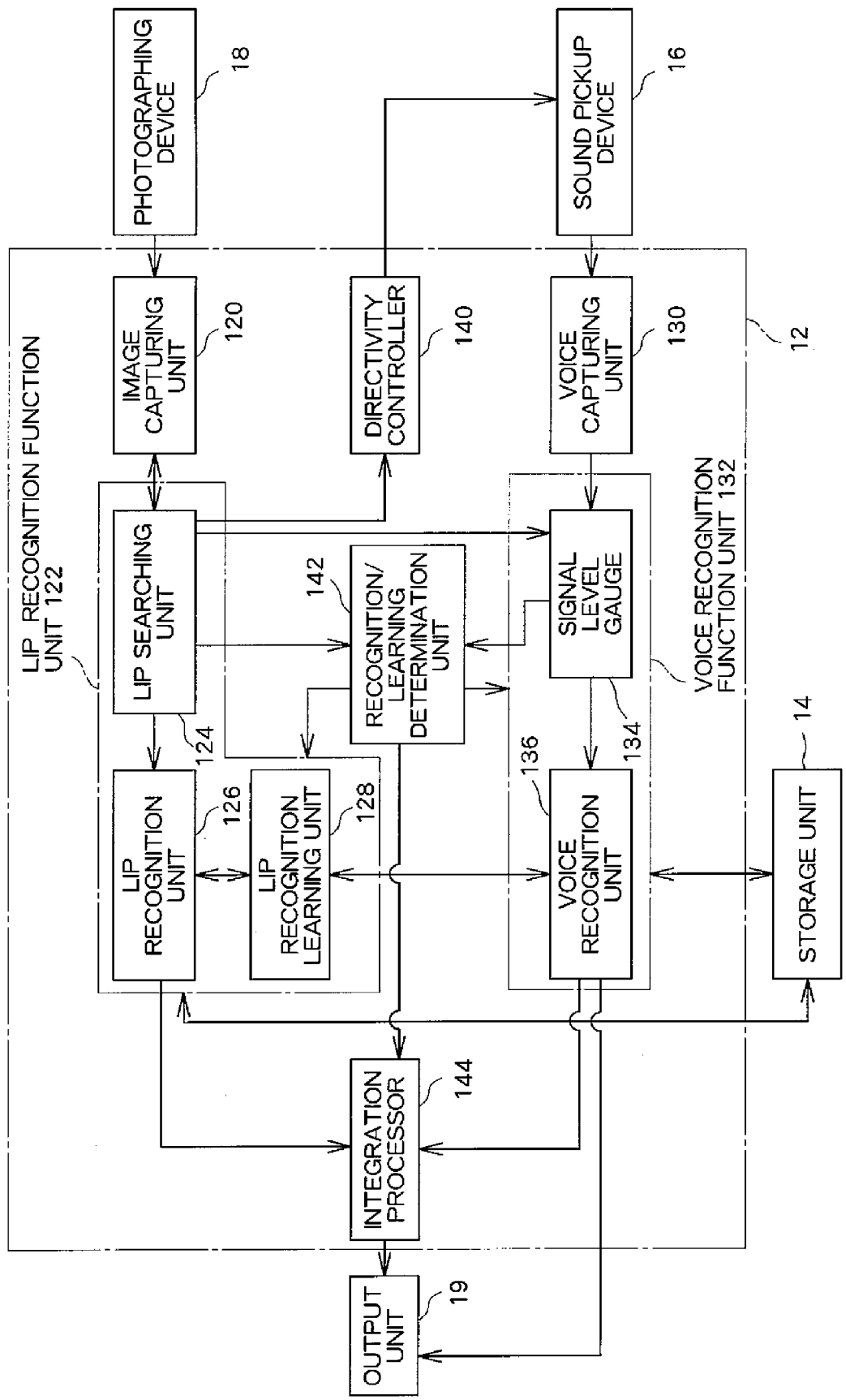
FIG. 2 is a functional block diagram of the speech recognition apparatus according to an embodiment of the present invention.
Figure 3:
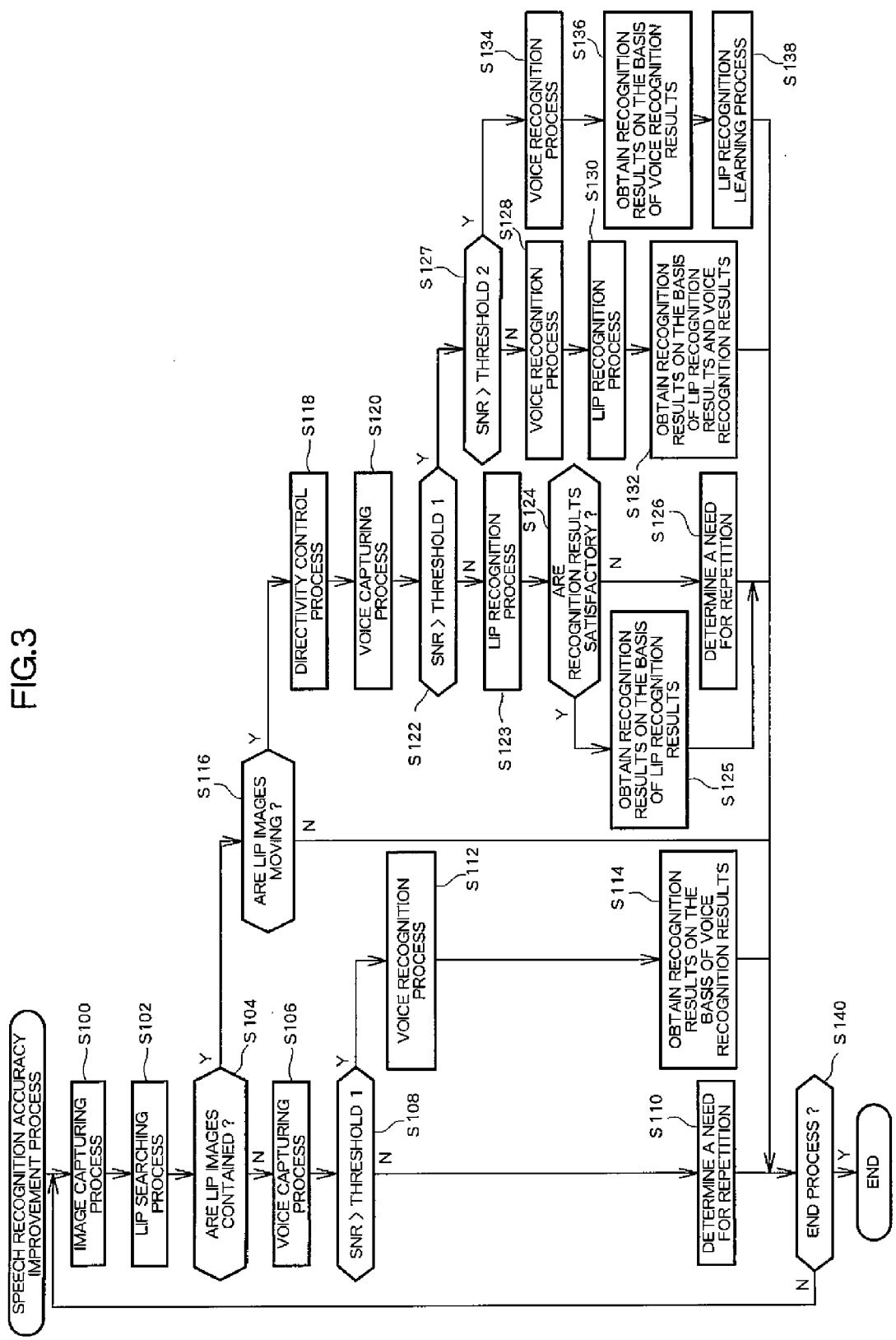
FIG. 3 is a flowchart of the process of the speech recognition apparatus according to an embodiment of the present invention.

FIG. 2 is a functional block diagram of the speech recognition apparatus 10 for implementing functions described above. As shown in this diagram, the CPU 12 of the speech recognition apparatus 10 functionally includes an image capturing unit 120, a lip searching unit 124, a lip recognition unit 126, a lip recognition learning unit 128, a voice capturing unit 130, a signal level gauge 134, a voice recognition unit 136, a directivity controller 140, a recognition/learning determination unit 142, and an integration processor 144. The lip searching unit 124, the lip recognition unit 126, and the lip recognition learning unit 128 constitute a lip recognition function unit 122; and the signal level gauge 134 and the voice recognition unit 136 constitute a voice recognition function unit 132. The processes of these units are described in detail hereinbelow.

First, the image capturing unit 120 sequentially captures images photographed by the photographing device 18. When a speaker is speaking into the sound pickup device 16, lip images showing the shape of the speaker's lips are contained in these images. When the photographing device 18 sequentially captures images containing lip images, a series of images contains lip images showing transitions in the shape of the speaker's lips. The image capturing unit 120 sequentially outputs the captured images to the lip searching unit 124.

The image capturing unit 120 also obtains direction information indicating the direction in which the photographing device 18 takes photographs. This direction information indicates a direction in which the photographing device 18 takes photographs in relation to, e.g., the casing of the speech recognition apparatus 10. The image capturing unit 120 then correlates the obtained direction information with the captured images and sequentially outputs this information to the lip searching unit 124.

The lip searching unit 124 performs a search to determine whether or not the lip images are contained in the images sequentially inputted from the image capturing unit 120. Specifically, a characteristic pattern indicating the characteristics of the lip shapes is extracted from the images. In cases in which a characteristic pattern indicating the characteristics of the lip shapes is successfully extracted, lip-detected information indicating the successful extraction of a characteristic pattern is outputted to the recognition/learning determination unit 142. In cases in which a characteristic pattern indicating the characteristics of the lip shapes is not successfully extracted, lip-undetected information indicating that the characteristic pattern could not be extracted is outputted to the recognition/learning determination unit 142. The in-image position of the lips shown in the successfully retrieved lip image is outputted to the directivity controller 140, as is the direction information correlated with the images containing the lip images and inputted from the image capturing unit 120.

Furthermore, the lip searching unit 124 extracts a characteristic pattern indicating the characteristics of the lips from each of a series of images, and then determines at predetermined time intervals whether or not the lips are moving on the basis of the variation in the extracted characteristic pattern. In cases in which it is determined that the lips are moving, the lip searching unit 124 outputs moving lip information indicating that the lips are moving to the signal level gauge 134 and the recognition/learning determination unit 142. In cases in which it is determined that the lips are not moving, the lip searching unit 124 outputs motionless lip information indicating that the lips are not moving to the signal level gauge 134 and the recognition/learning determination unit 142.

The lip searching unit 124 outputs the images sequentially inputted from the image capturing unit 120 without modification to the lip recognition unit 126.

Next, the directivity controller 140 controls the directivity of the sound pickup device 16 on the basis of the in-image position of the lips shown in the successfully retrieved lip images inputted from the lip searching unit 124, and on the basis of the direction information correlated with the images containing the lip images and inputted from the image capturing unit 120. More specifically, the directivity of the sound pickup device 16 is controlled so that the directivity of the sound pickup device 16 is oriented in the direction indicated by the photographing direction of the photographed images and the position of the lips in particular in the images. The directivity controller 140 thereby ensures adequate pickup of the voices of the speaker, which will be described later.

Next, the voice capturing unit 130 sequentially captures the voices picked up by the sound pickup device 16. These voices include the voices made by the speaker and other noise. The voice capturing unit 130 then sequentially outputs the captured voices to the signal level gauge 134 and the voice recognition unit 136.

The signal level gauge 134 sequentially obtains sound pickup condition evaluation values indicating the condition of sound pickup for the voices sequentially inputted from the voice capturing unit 130. Specifically, a voice signal-to-noise ratio (SNR), for example, can be used as the sound pickup condition evaluation value. When this SNR is used as the sound pickup condition evaluation value, the sound pickup condition evaluation value is a ratio of the voices made by the speaker and contained in the inputted sounds to other noise. The signal level gauge 134 outputs the obtained sound pickup condition evaluation value to the recognition/learning determination unit 142. The signal level gauge 134 also outputs the voices sequentially inputted from the voice capturing unit 130 without modification to the voice recognition unit 136.

The signal level gauge 134 uses moving lip information or motionless lip information inputted from the lip searching unit 124 in order to distinguish between voices made by the speaker and other sounds. When the inputted moving lip information indicates that the lips are moving, the signal level gauge 134 determines that the voices inputted from the voice capturing unit 130 include voices made by the speaker. In this case, the signal level gauge 134 extracts a characteristic pattern stored in the storage unit 14 from the inputted voices and separates this pattern into voice signals made up of the voices made by the speaker, and noise signals made up of other noise. The SNR is calculated based on the strength of these separated signals. When the inputted motionless lip information indicates that the lips are not moving, the signal level gauge 134 determines that the voices inputted from the voice capturing unit 130 do not include voices made by the speaker. In this case, the SNR is zero because there are no voice signals.

Alternatively, when the strength of the noise signals is not expected to change by much, it may be assumed in the signal level gauge 134 that signal strength obtained by subtracting "signal strength of the voices inputted from the voice capturing unit 130 when the inputted motionless lip information indicates that the lips are not moving" from "signal strength of the voices inputted from the voice capturing unit 130 when the moving lip information indicates that the lips are moving" is the signal strength of voices made by the speaker, and SNR may be calculated.

The recognition/learning determination unit 142 controls the voice recognition function unit 132 and the lip recognition function unit 122 on the basis of the lip-detected information or lip-undetected information inputted from the lip searching unit 124, the moving lip information or motionless lip information, and the sound pickup condition evaluation values inputted from the signal level gauge 134.

Specifically, the recognition/learning determination unit 142 determines, according to the lip-detected information or lip-undetected information inputted from the lip searching unit 124, whether or not the images photographed by the photographing device 18 contain lip images showing the lips of the speaker. The recognition/learning determination unit 142 also determines, according to the moving lip information or motionless lip information inputted from the lip searching unit 124, whether or not the lips shown in the lip images contained in the images photographed by the photographing device 18 are moving. Furthermore, the recognition/learning determination unit 142 determines, depending on the magnitude of the result obtained when the sound pickup condition evaluation value inputted from the signal level gauge 134 is compared with a threshold, whether or not the voices of the speaker are being adequately picked up by the sound pickup device 16. The recognition/learning determination unit 142 classifies sound pickup condition as poor (sound pickup condition level 0) when the sound pickup condition evaluation value is lower than the threshold. When the sound pickup condition evaluation value is higher than this threshold, the sound pickup condition evaluation value inputted from the signal level gauge 134 is compared with a second threshold. The sound pickup condition is classified as adequate (sound pickup condition level 1) when the sound pickup condition evaluation value is lower than the second threshold. The sound pickup condition is classified as very adequate (sound pickup condition level 2) when the sound pickup condition evaluation value is higher than the second threshold.

The recognition/learning determination unit 142 controls the voice recognition function unit 132 and the lip recognition function unit 122 on the basis of the results of these determinations.

Specifically, in cases in which the images do not contain lip images and the sound pickup condition of the speaker's voices is poor, the recognition/learning determination unit 142 restricts the voice recognition unit 136 from recognizing voices and prevents voices from being recognized. Conversely, in cases in which the images do not contain lip images but sound pickup of the speaker's voices is adequate (sound pickup condition level 1 or 2), the recognition/learning determination unit 142 controls the voice recognition function unit 132 so that the voice recognition unit 136 recognizes voices.

In cases in which the images do contain lip images but it is determined that the lips shown in these lip images are not moving, the recognition/learning determination unit 142 restricts the voice recognition unit 136 from recognizing voices and prevents voices from being recognized. In cases in which it is determined that the lips shown in the lip images are moving, the recognition/learning determination unit 142 performs a different process, depending on the sound pickup conditions in which the sound pickup device 16 is picking up the speaker's voices.

Specifically, in cases in which the conditions in which the sound pickup device 16 is picking up the speaker's voices are extremely good (sound pickup condition level 2), the recognition/learning determination unit 142 controls the voice recognition function unit 132 so that the voice recognition unit 136 recognizes voices, and also instructs the lip recognition function unit 122 so that the lip recognition unit 126 learns to recognize lip shapes. This lip recognition learning will be described in detail later.

In cases in which the sound pickup conditions in which the sound pickup device 16 is picking up the speaker's voices are good (sound pickup condition level 1), the recognition/learning determination unit 142 controls the lip recognition function unit 122 and the voice recognition function unit 132 so that the former recognizes lip shapes with the aid of the lip recognition unit 126, and the latter recognizes voices with the aid of the voice recognition unit 136. The integration processor 144 is also instructed to output recognition results on the basis of the lip recognition of the lip recognition unit 126 and the voice recognition of the voice recognition unit 136. As will be described later, the integration processor 144 generates recognition results on the basis of the lip recognition results and the voice recognition results, and outputs the generated recognition results to the output unit 19.

Furthermore, in cases in which the sound pickup conditions in which the sound pickup device 16 is picking up the speaker's voices are poor (sound pickup condition level 0), the recognition/learning determination unit 142 restricts the voice recognition unit 136 from recognizing voices, prevents voices from being recognized, and instead causes lip shapes to be recognized. Specifically, the recognition/learning determination unit 142 determines whether voices will be recognized or lip shapes will be recognized according to the sound pickup conditions in which the speaker's voices are being picked up, and switches voice recognition to lip recognition when the sound pickup conditions in which speaker's voices are being picked up are poor.

The voice recognition unit 136 recognizes voices on the basis of the voices sequentially inputted from the signal level gauge 134. The voice recognition unit 136 does not recognize voices when restricted from doing so.

In cases in which voices are recognized, the voice recognition unit 136 first extracts a characteristic pattern stored in the storage unit 14 from the sequentially inputted voices. A character string pattern correlated with the extracted characteristic pattern and stored in the storage unit 14 is outputted as a voice recognition result to the integration processor 144 and the lip recognition learning unit 128.

Another option is one in which the signal level gauge 134 extracts the characteristic pattern, and the voice recognition unit 136 receives the characteristic pattern extracted by the signal level gauge 134. In cases in which, for example, the voice recognition unit 136 is restricted from recognizing voices due to poor sound pickup conditions, the voice recognition unit 136 may instruct the output unit 19 to output a display or sound in order to prompt the speaker to repeat his or her words. In other words, in accordance with this instruction from the voice recognition unit 136, the output unit 19 produces instructional information instructing the speaker to repeat his or her words.

The lip recognition unit 126 recognizes lip shapes on the basis of the images sequentially inputted from the lip searching unit 124. The lip recognition unit 126 does not recognize lip shapes when restricted from doing so.

In cases in which lip shapes are recognized, the lip recognition unit 126 first extracts from the sequentially inputted images a characteristic pattern of the lip shapes stored in the storage unit 14 or a characteristic pattern of the transitions of these shapes. A character string pattern correlated with the extracted characteristic pattern and stored in the storage unit 14 is then outputted as lip recognition results to the integration processor 144. Another option is one in which the lip searching unit 124 extracts the characteristic pattern, and the lip recognition unit 126 receives the characteristic pattern extracted by the lip searching unit 124. When the lip recognition unit 126 has successfully outputted a character string pattern on the basis of the extracted characteristic pattern, it is determined that satisfactory recognition results have been obtained.

Lip recognition learning of the lip recognition unit 126 is performed in cases in which the lip recognition learning unit 128 has been instructed to perform lip recognition learning of the lip recognition unit 126 for the lip recognition function unit 122 from the recognition/learning determination unit 142.

Specifically, the lip recognition learning unit 128 obtains a characteristic pattern of the shapes or shape transitions extracted in the lip recognition unit 126, as well as a character string pattern, which is a voice recognition result of the voices made by the speaker at a certain time or period, for the shape of the speaker's lips at a certain time or period. The obtained characteristic pattern and character string pattern are correlated and stored in the storage unit 14. Thus, lip recognition learning for the lip recognition unit 126 can be performed by updating the characteristic pattern and the character string pattern of the lip shapes and shape transitions stored in the storage unit 14.

In other words, the lip recognition learning unit 128 learns lip recognition on the basis of the voice recognition results based on the picked-up voices, and on the basis of the lip shapes or shape transitions shown in the lip images contained in the images photographed when the speaker is making voices.

In cases in which it is detected that no instructions have been received from the recognition/learning determination unit 142 for a specific period of time, the lip recognition learning unit 128 may also perform repeated learning (iterative learning) on the basis of the characteristic pattern and character string pattern of the lip shapes or shape transitions previously stored in the storage unit 14.

In cases in which the recognition/learning determination unit 142 has given instructions to output recognition results on the basis of the lip recognition results from the lip recognition unit 126 and the voice recognition results from the voice recognition unit 136, the integration processor 144 generates recognition results on the basis of the lip recognition results from the lip recognition unit 126, and the voice recognition results from the voice recognition unit 136, and outputs these generated recognition results to the output unit 19. In cases in which the recognition/learning determination unit 142 has not given instructions to output recognition results on the basis of the lip recognition results from the lip recognition unit 126 and the voice recognition results from the voice recognition unit 136, the voice recognition results from the voice recognition unit 136 are outputted as recognition results to the output unit 19.

The process for generating recognition results on the basis of the lip recognition results from the lip recognition unit 126 and the voice recognition results from the voice recognition unit 136 may be a process for obtaining either the lip recognition results or the voice recognition results as the recognition results, or a process for generating recognition results based on both the lip recognition results and the voice recognition results.

The process for improving the accuracy of speech recognition in the speech recognition apparatus 10 described above will now be described more specifically with reference to flowchart of the process.

First, the image capturing unit 120 performs an image capturing process for sequentially capturing images photographed by the photographing device 18 (S100). Next, the lip searching unit 124 searches for images of the speaker's lips in the images captured in the image capturing unit 120 (S102). More specifically, a characteristic pattern of the shapes of the speaker's lips is extracted from the images. The lip searching unit 124 performs this characteristic pattern extraction process for a series of images (S102).

The lip searching unit 124 then determines whether or not the images contain images of the speaker's lips (S104). When it is determined that they do not contain lip images, the speech recognition apparatus 10 advances to the process in S106. When it is determined that they do contain lip images, the speech recognition apparatus 10 advances to the process in S116.

In S106, the voice capturing unit 130 performs a voice capturing process to sequentially capture the voices picked up by the sound pickup device 16 (S106). The signal level gauge 134 then sequentially measures the SNR of the voices sequentially captured by the voice capturing unit 130. Threshold 1 is then read from the storage unit 14, and the speech recognition apparatus 10 performs a different process depending on whether or not the measured SNR exceeds threshold 1 (S108).

When the measured SNR does not exceed threshold 1, the voice recognition function unit 132 performs a process for asking the speaker to repeat his or her words (S110). When the measured SNR exceeds threshold 1, the voice recognition function unit 132 recognizes voices on the basis of the speaker's voices sequentially captured by the sound pickup device 16, and the integration processor 144 obtains and outputs the voice recognition results outputted from the voice recognition function unit 132 as recognition results (S114).

In S116, the lip searching unit 124 determines whether or not the lips are moving by the lip images obtained based on the characteristic pattern extracted from the series of images (S116). When it is determined that the lips are not moving, the speech recognition apparatus 10 ends the process without performing either the voice recognition process or the lip recognition process (S140). When it is determined that the lips are moving, the speech recognition apparatus 10 performs the following process.

Specifically, the speech recognition apparatus 10 performs a directivity control process for aligning the directivity of the sound pickup device 16 toward the lips of the speaker (S118). The speech recognition apparatus 10 then performs a voice capturing process for voice capturing unit 130 to sequentially capture the voices picked up by the sound pickup device 16 (S120). The speech recognition apparatus 10 then uses the signal level gauge 134 to sequentially measure the SNR of the voices sequentially captured by the voice capturing unit 130. The speech recognition apparatus 10 then reads threshold 1 and threshold 2 (threshold 2>threshold 1) from the storage unit 14, and performs different processes in cases in which the measured SNR does not exceed threshold 1, in cases in which the SNR exceeds threshold 1 but does not exceed threshold 2, and in cases in which the SNR exceeds threshold 2 (S122, S127).

First, in cases in which the SNR does not exceed threshold 1, the speech recognition apparatus 10 uses the lip recognition function unit 122 to perform a lip recognition process based on the lip images contained in the images sequentially photographed by the photographing device 18 (S123). The lip recognition unit 126 then determines whether or not satisfactory recognition results were successfully obtained (S124). In cases in which satisfactory recognition results were obtained, the speech recognition apparatus 10 uses the integration processor 144 to obtain and output the lip recognition results outputted from the lip recognition function unit 122 as recognition results (S125). In cases in which it is determined that satisfactory recognition results could not be obtained, the voice recognition unit 136 performs a process for asking the speaker to repeat his or her words (S126).

Next, in cases in which the measured SNR exceeds threshold 1 but does not exceed threshold 2, the speech recognition apparatus 10 uses the voice recognition function unit 132 to perform a voice recognition process (S128) based on the speaker's voices sequentially picked up by the sound pickup device 16, and uses the lip recognition function unit 122 to perform a lip recognition process (S130) based on the lip images contained in the images sequentially photographed by the photographing device 18. The speech recognition apparatus 10 then uses the integration processor 144 to generate, obtain, and output recognition results on the basis of the recognition results of the voice recognition process and the recognition results of the lip recognition process (S132).

In cases in which the SNR exceeds threshold 2, the speech recognition apparatus 10 uses the voice recognition function unit 132 to perform a voice recognition process based on the speaker's voices sequentially picked up by the sound pickup device 16 (S134). The speech recognition apparatus 10 then uses the integration processor 144 to obtain and output the voice recognition results outputted from the voice recognition function unit 132 as recognition results (S136). Furthermore, the speech recognition apparatus 10 performs a process for learning lip recognition on the basis of these output results and the characteristic pattern of lip images contained in the images sequentially photographed by the photographing device 18 (S138).

A determination is then made as to whether or not to end the process for improving the accuracy of speech recognition executed as described above. The process is ended when it is determined that it should be ended, and the process beginning with S100 is repeated when it is determined that it should not be ended (S140).

As described above, since the speech recognition apparatus 10 determines whether or not at least part of the speaker is included in the images photographed by the photographing device 18, the speech recognition apparatus 10 can prevent voices from being recognized with poor accuracy even when the speaker in the lip images is not close to the sound pickup device 16. Since it is determined whether or not lip images are contained in the images photographed by the photographing device 18, the speech recognition apparatus 10 can also prevent voices from being recognized with poor accuracy when the voices made by the speaker do not easily reach the pattern recognition device. Furthermore, since it is determined whether or not the lip images are moving in the images photographed by the photographing device 18, the speech recognition apparatus 10 prevents voices from being recognized with poor accuracy when the speaker is not speaking. The speech recognition apparatus 10 can also capture the voices made by the speaker in a more adequate condition of sound pickup by controlling the directivity of the sound pickup device 16 and aligning the directivity of the voice capturing device towards the speaker's lips. Since lip recognition learning is performed based on the recognition results of voice recognition and the lip shapes or shape transitions of the lips making voices, the speech recognition apparatus 10 can improve the accuracy of lip recognition. Furthermore, since the integration processor 144 generates recognition results on the basis of both the lip recognition results and the voice recognition results, the speech recognition apparatus 10 can improve the accuracy of the recognition results of pattern recognition. Lip recognition learning is performed when the sound pickup conditions in which the sound pickup device 16 is picking up the speaker's voices are extremely good, and lip recognition is not performed when the sound pickup conditions are otherwise. The speech recognition apparatus 10 can therefore reduce the possibility that lip recognition learning will be performed based on the recognition results of inaccurate voice recognition. Since the speech recognition apparatus 10 switches between voice recognition and lip recognition in accordance with the sound pickup conditions in which the sound pickup device 16 is picking up the speaker's voices, the speech recognition apparatus 10 can prevent voices from being recognized with poor accuracy when sound pickup conditions are poor.

The present invention is not limited to the embodiments described above. For example, the speech recognition apparatus 10 may include multiple sound pickup devices 16. In this case, the signal level gauge 134 picks up voice signals and noise signals in the sound pickup devices 16 that are directed towards the position of the lips shown in the lip images contained in the images photographed by the photographing device 18. The signal level gauge may make a determination that all the voices picked up by sound pickup devices 16 directed in other directions are noise signals.

The direction in which the photographing device 18 takes photographs may be controlled so that the photographing direction of the photographing device 18 as such is aligned toward the position of the lips shown in the lip images contained in the images photographed by the photographing device 18. Specifically, the CPU 10 may control the direction in which the photographing device 18 takes photographs in accordance with the position of the lips shown in the lip images contained in the images photographed by the photographing device 18.

Furthermore, the storage unit 14 may store characteristic patterns of voices for multiple people, or characteristic patterns of lip shapes or shape transitions for multiple people. In this case, the signal level gauge 134 may treat the captured voices as noise when the characteristic pattern of voices extracted from the voices picked up by the sound pickup device 16 and the pattern of lip shapes or shape transitions extracted from the images photographed by the photographing device 18 do not belong to the same person. The directivity controller 140 may abort the process for aligning the directivity toward the position of the lips shown in the lip images. The recognition/learning determination unit 142 may also be designed to not perform the voice recognition process, the lip recognition process, or the lip recognition learning process.

In cases in which the storage unit 14 stores characteristic patterns of voices for multiple people, or characteristic patterns of lip shapes or shape transitions for multiple people, RFID (wireless IC tag) information may furthermore be correlated with personal information indicating each person and stored. In this case, if the speech recognition apparatus 10 includes RFID reading device, the speech recognition apparatus 10 can detect the RFID with the aid of the RFID reading device to determine whether or not the person using the speech recognition apparatus 10 is the person having the stored RFID. When it is determined that a person not having the RFID is using the speech recognition apparatus 10, the speech recognition apparatus 10 may refrain from performing the processes described above. When it is determined that the person using the speech recognition apparatus 10 is the person having the stored REID, the speech recognition apparatus 10 may use the characteristic pattern for the person indicated by the personal information correlated with and stored in the RFID.

The invention claimed is:

1. A speech recognition apparatus, comprising:
   a sound pickup device picking up sound;
   a photographing device photographing images of a speaker making voices into the sound pickup device;
   a voice recognition unit recognizing voices on the basis of the picked-up voices;
   a voice recognition restriction unit restricting the voice recognition unit from recognizing voices when the photographed images do not contain speaker images showing at least part of the speaker;
   a storage unit storing characteristic patterns of lip shapes or shape transitions correlated with character string patterns;
   a lip recognition unit recognizing lip shapes by extracting a characteristic pattern of the lip shapes of the speaker or a characteristic pattern of transitions of the shapes from the lip images contained in the photographed images and by obtaining the character string pattern correlated with the extracted characteristic pattern and stored in the storage unit; and
   a lip recognition learning unit correlating the characteristic patterns and the character string patterns,
   wherein the character string patterns are on the basis of recognition results of the voice recognition unit when the speaker is making voices, wherein the characteristic patterns are on the basis of the lip shapes or the transitions of the shapes shown in the speaker images when the voice recognition results are obtained.

2. The speech recognition apparatus according to claim 1, wherein the photographing device sequentially photographs the images; and
the voice recognition restriction unit restricts the voice recognition unit from recognizing voices when the lips shown in the sequentially captured lip images is not moving, even in cases in which the lip images are contained in the photographed images.

3. A speech recognition apparatus, comprising:
a sound pickup device picking up sound;
a photographing device photographing lip images showing the lips of a speaker making voices into the sound pickup device;
a sound pickup condition evaluation value obtaining unit obtaining a sound pickup condition evaluation value indicating the pickup condition of voices picked up by the sound pickup device;
a voice recognition unit recognizing voices on the basis of the picked-up voices;
a lip recognition unit recognizing lip shapes on the basis of the lip shapes of the speaker or transitions of the shapes shown in the lip images contained in the photographed images; and
a determiner determining, in accordance with the sound pickup condition indicated by the sound pickup condition evaluation value, whether to recognize voices with the aid of the voice recognition unit or with the aid of the lip recognition unit,
wherein the sound pickup condition evaluation value obtaining unit distinguishes between voices made by the speaker and other sounds on the basis of the lip shapes or the transitions of the shapes shown in the speaker images when the speaker is making voices to obtain the sound pickup condition evaluation value.

4. A speech recognition method, comprising:
a sound pickup step of picking up sounds by a sound pickup device;
a photographing step of photographing images of a speaker making voices into the sound pickup device;
a voice recognition step of recognizing voices on the basis of the picked-up voices;
a voice recognition restriction step of restricting voice recognition in the voice recognition step when the photographed images do not contain speaker images showing at least part of the speaker;
a storage step of storing characteristic patterns of lip shapes or shape transitions correlated with character string patterns in a storage unit;
a lip recognition step of recognizing lip shapes by extracting a characteristic pattern of the lip shapes of the speaker or a characteristic pattern of transitions of the shapes from the lip images contained in the photographed images and by obtaining the character string pattern correlated with the extracted characteristic pattern and stored in the storage unit by a lip recognition unit;
a lip recognition learning step of correlating the characteristic patterns and the character string patterns,
wherein the characteristic patterns and the character string patterns are on the basis of the recognition results of the voice recognition step,
wherein the characteristic patterns are on the basis of the lip shapes or the transitions of the shapes shown in the speaker images when the voice recognition results are obtained.

5. A speech recognition apparatus, comprising:
a sound pickup device picking up sound;
a photographing device photographing lip images showing the lips of a speaker making voices into the sound pickup device;
a sound pickup condition evaluation value obtaining unit obtaining a sound pickup condition evaluation value indicating the pickup condition of voices picked up by the sound pickup device;
a voice recognition unit recognizing voices on the basis of the picked-up voices;
a storage unit storing characteristic patterns of lip shapes or shape transitions correlated with character string patterns;
a lip recognition unit recognizing lip shapes by extracting a characteristic pattern of the lip shapes of the speaker or a characteristic pattern of transitions of the shapes from the lip images contained in the photographed images and by obtaining the character string pattern correlated with the extracted characteristic pattern and stored in the storage unit;
a lip recognition learning unit correlating the characteristic patterns and the character string patterns; and
a determiner determining, in accordance with the sound pickup condition indicated by the sound pickup condition evaluation value, whether to recognize voices with the aid of the voice recognition unit or with the aid of the lip recognition unit,
wherein the character string patterns are on the basis of voice recognition results of the voice recognition unit when the speaker is making voices,
wherein the characteristic patterns are on the basis of the lip shapes or the transitions of the shapes shown in the speaker images when the voice recognition results are obtained.

* * * * *